United States Patent [19]

Rogers

[11] Patent Number: 5,193,774
[45] Date of Patent: Mar. 16, 1993

[54] MOUNTING BRACKET APPARATUS

[76] Inventor: John W. Rogers, 12667 Memorial Dr., #102, Houston, Tex. 77024

[21] Appl. No.: 887,854

[22] Filed: May 26, 1992

[51] Int. Cl.⁵ .............................................. A47B 96/06
[52] U.S. Cl. .................................. 248/219.4; 211/107; 248/230
[58] Field of Search ...................... 248/230, 231, 219.4, 248/218.4, 219.1; 211/107; 174/163; 52/721, 697

[56] References Cited

U.S. PATENT DOCUMENTS

| | | | |
|---|---|---|---|
| 2,708,087 | 5/1955 | Blackstone | 211/107 |
| 2,765,474 | 10/1956 | Duncan | 248/230 X |
| 2,879,964 | 3/1959 | Anderson | 211/107 |
| 3,374,978 | 3/1968 | Salmon | 211/107 |
| 3,497,171 | 2/1970 | Farmer | 248/230 |
| 3,734,438 | 5/1973 | Kautz | 211/107 |
| 3,750,992 | 8/1973 | Johnson | 211/107 |
| 4,103,853 | 8/1978 | Bannan | 248/230 X |
| 4,903,927 | 2/1990 | Farmer | 248/219.4 |

Primary Examiner—J. Franklin Foss
Attorney, Agent, or Firm—Dodge, Bush, Moseley & Riddle

[57] ABSTRACT

A mounting bracket apparatus for securing a relatively heavy item of equipment such as an electrical transformer to an upstanding object or structure such as a utility pole. The mounting bracket employs a plurality of elongated and symmetrically shaped object contact members that each contact the pole at spaced gripping locations to enhance the frictional contact force.

8 Claims, 3 Drawing Sheets

MOUNTING BRACKET APPARATUS

BACKGROUND OF THE INVENTION

A mounting bracket apparatus is commonly used to operably mount or structurally support a preselected device or equipment item at a desired location on a support member or object. The mounting bracket apparatus is suitably secured to the supporting object at the desired location and the preselected item of equipment is mounted to the apparatus.

FIELD OF THE INVENTION

This field of this invention relates generally to a mounting bracket apparatus for mounting a preselected device to an object or structure and more specifically to a mounting bracket apparatus for supporting electrical transformers on utility poles.

DESCRIPTION OF THE RELATED ART

Support bracket devices for mounting various preselected devices to lighting poles, utility poles or other vertical or substantially upright support objects are well known. In the case of metal or wooden utility or lighting poles, the mounting bracket apparatus may be strapped to the pole with surrounding metal bands or attached by conventional threaded clamping U-bolts as disclosed in U.S. Pat. No. 4,325,529 to Seebinger. If the weight or suspended load of the device to be mounted on the pole is relatively heavy, such as an electrical transformer, stronger structural means for mounting to the pole are required. In another known arrangement, conventional threaded metal support bolts are positioned in openings drilled through the wooden utility pole and the mounting bracket is then supported on the bolts, such as disclosed in Sloop U.S. Pat. No. 3,704,001.

Another common type of arrangement is to employ conventional helically threaded bolting in an arrangement to grip, clamp or hold the support members on opposite sides of the pole. Such an arrangement is disclosed in U.S. Pat. Nos. 2,883,135 and 2,883,136, both to Smalley. For a variation of this holding arrangement using a single threaded bolt, see U.S. Pat. No. 3,750,992 to Johnson.

Another approach has been to employ a hinged or flexible pole surrounding split collar apparatus having an inwardly projecting clamping bolt such as disclosed in U.S. Pat. No. 3,503,580 to Levy or U.S. Pat. No. 3,561,712 to Newsome.

U.S. Pat. No. 2,708,087 to Blackstone discloses a transformer support rack having a plurality of three pole gripping or contact members radially interconnected by specialized T-headed curved bolts for maintaining the contact members in the pole gripping relationship. As the pole contact members are not in elongated contact with the pole, a pair of racks must be used to surround the pole at vertically spaced locations to properly support a heavy load such as a transformer.

The Ward U.S. Pat. No. 2,761,643 discloses an electrical transformer mounting bracket or support rack operably connected by a plurality of conventional threaded bolts at vertically spaced locations on the mounting pole or object. To compensate for variation in pole circumference or diameter, the tightening of the plurality of connecting bolts must be coordinated to obtain the proper support fit with the pole.

U.S. Pat. No. 3,374,978 to Salmon et al. discloses an electrical transformer mounting device having a plurality of three elongated bearing plates fastened about the utility pole using a circumferential connecting linkage arrangement for selective compensations for variations in pole circumference. The elongated bearing plates are generally U-shaped with a pair of outwardly extending flanges and symmetrical about a center plane. The contact surface bearing of the plates is arcuate in shape with a forming radius to generally correspond to the outer surface configuration of the vertical pole. Equipment mounting brackets are attached to the bearing contact plates and may be rotated or inverted to adjust or compensate for different sizes of transformers. Each connecting link means employs a hook means at the terminal ends which are easily inserted in cooperating slots in the bearing plates for securing in the circumferentially spaced apart manner. A single bolt and nut arrangement is then used to adjustably clamp the mounting device in place on the pole.

Canadian Patent No. 826,995 to Lile and Salmon discloses an electrical transformer mounting bracket assembly substantially the same as disclosed in Salmon and Lile U.S. Pat. No. 3,374,978.

The Kautz U.S. Pat. No. 3,734,438 discloses an apparatus for mounting a transformer having a plurality of three elongated support-engaging bearing plates having a mounting bracket slidably connected to each bearing plate. The bearing plates are connected about the pole by an adjustable link assembly for effecting clamping engagement of the bearing plate against the pole. The pole engaging surface of the extruded aluminum bearing plate is generally arcuate having a forming radius to conform to the outer surface of the pole.

U.S. Pat. No. 3,856,250 to Farmer discloses an "Interengaged Component Electrical Equipment Mount". The disclosed mount includes a bearing plate which may be mounted by bolts or other means to the pole. The bearing plate pole engaging surface is provided with projecting cleats that are forced into the pole to fix the bearing plate against the pole.

U.S. Pat. No. 3,497,171 and its Canadian counterpart No. 829,148 to Farmer and Garner disclose an adjustable mounting bracket fixture for attachment to a utility pole having dissimilar diameters and thicknesses. The disclosed fixtures encircles the utility pole using connecting straps for linking the circumferentially spaced pole engaging brackets. The fixture is adjusted to conform to the utility pole by tightening of a single conventional bolt.

The U.S. Pat. No. 4,103,853 to Bannan discloses an aluminum mount for supporting electrical transformers and like heavy objects from upright poles. The mount employs pole bearing plates held in circumferentially spaced relationship about the pole by adjustable link members to facilitate placement at the desired mounting position on the pole. The bearing plates are provided with a concave contact surface for contacting the pole.

All of the disclosure of each of the above identified U.S. patents are hereby fully and completely incorporated in the written description of this specification by this specific reference as if their entire content were set forth verbatim.

SUMMARY OF THE INVENTION

This invention relates generally to a mounting bracket device or apparatus for supporting an item of equipment on an object and preferably to a mounting bracket assembly for supporting an electrical transformer or other heavy weight on an upright utility pole having a substantially circular cross-section.

The mounting bracket apparatus or assembly includes a plurality of object contact members, a plurality of connecting links, an adjustment linkage and a plurality of equipment mounting brackets all operably arranged for encircling the support object or utility pole. The elongated object contacting members are placed in a desired circumferentially spaced clamping pattern surrounding the pole. The tension connecting links and adjustment linkage hold or secure the contact members in the desired pattern and in frictional supporting contact with the object. The adjustment linkage serves to tension the connecting links for radially compressing or constricting the plurality of object contact members in operable holding engagement with the object to fixedly frictionally support each contact member on the pole.

Each of the plurality of object contact members has a base portion and two flange portions. Each base portion forms an object contact surface for operable friction holding engagement with the outer surface of the object to fixedly support each contact member and the equipment mounting assembly on the object. Each elongated object contacting member is substantially U-shaped in cross-section having a longitudinally extending center line axis. The center of the cross-section of the object and the center line axis form a vertical center line plane when the object contact member is disposed in the predetermined circumferentially spaced pattern. The object contact surface formed on the base portion positions the flange portions extending radially outwardly of the base portion and the object when the object contact surface operably engages the object. The outwardly extending flange portion being disposed substantially symmetrical about the center line plane.

Each of the object contact surfaces have a generally circular arcuate shape of such forming diameter or radius to operably space the center portions from the object so that the friction bearing or engagement contact is concentrated at two localized engagement areas symmetrically located on opposite sides of the centerline plane. Such arrangement results in the formation of two contact angles or vectors for the friction force sections for enhancing the frictional clamping to the pole.

DETAILED DESCRIPTION OF THE PREFERRED EMBODIMENT

Figure 1:
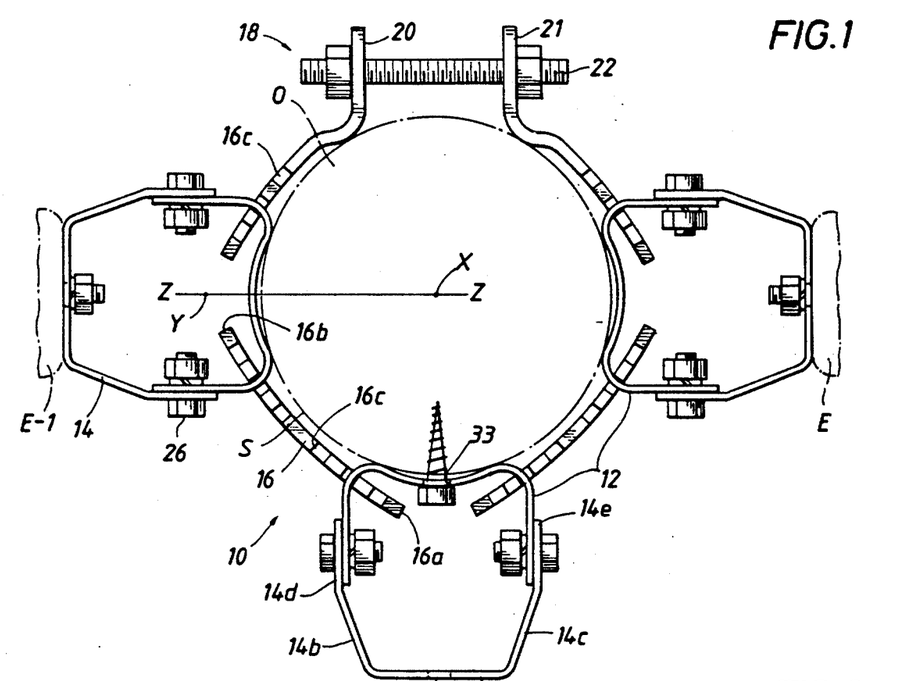
FIG. 1 is a top view of the mounting bracket of the present invention.
Figure 2:
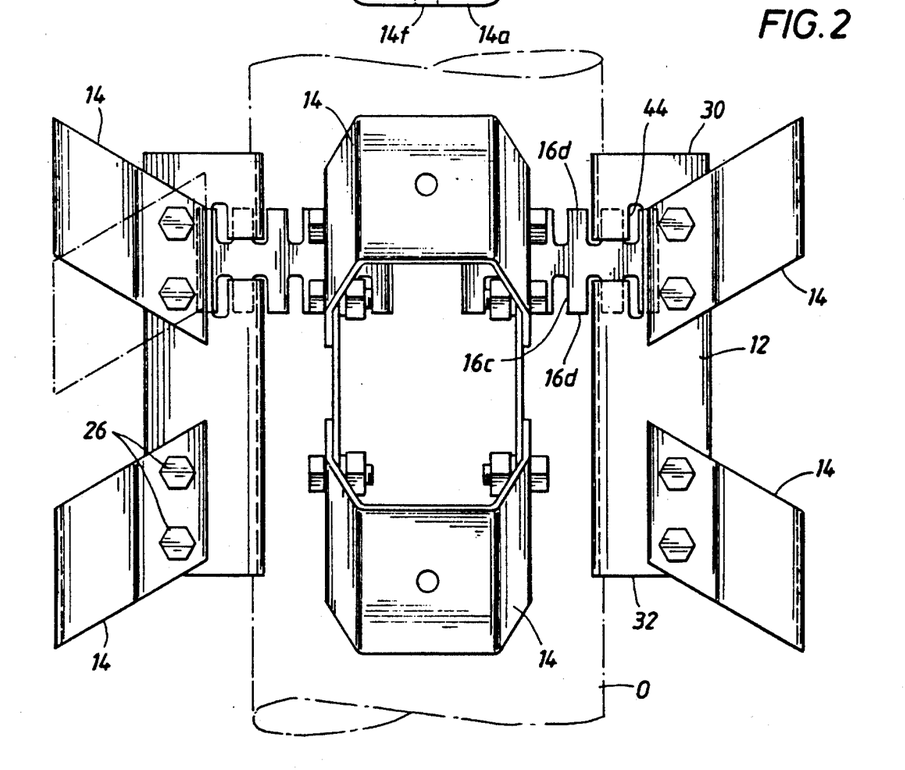
FIG. 2 is a side view of one embodiment of the present invention.
Figure 3:
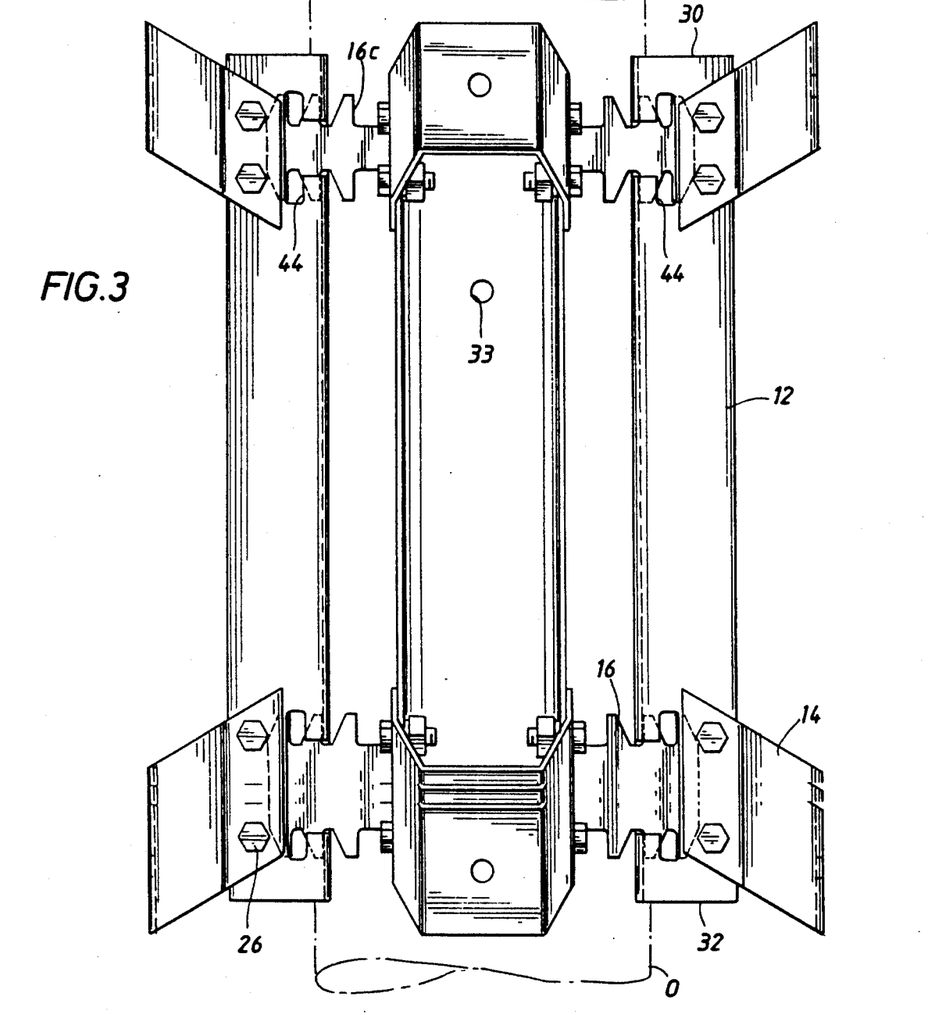
FIG. 3 is a side view of another embodiment of the present invention.

The equipment mounting assembly or support bracket apparatus of the present invention, generally designated as 10, is illustrated in the operably installed condition or configuration in a top plan view in FIG. 1 and in the side views of FIGS. 2 and 3. The apparatus 10 is operably positioned or disposed in a predetermined circumferentially spaced pattern or surrounding relationship with a fixed support member O. By inducing a desired preload hoop tension in the surrounding apparatus 10, a clamping or radially constricting friction securing or holding force with the support member O is provided. The apparatus 10 is fixedly secured or clamped at a desired location on the support member or object O for structurally supporting, carrying or mounting a preselected device or item of equipment E in response to the hoop tension.

While the mounting bracket apparatus 10 may be usefully employed to structurally support or mount any type of preselected equipment E on the object O, the preferred use of the present invention is mounting or carrying electrical transformers or other relatively heavy equipment from the object O. For purposes of this disclosure the preselected device or item of equipment E will be specifically described as an electrical transformer, but the present invention contemplates support of many other types or forms of devices or equipment and the present invention should not be considered as limited to only supporting electrical transformers. As electrical transformers E are normally employed in a three phase or three wire electrical system, it is also common and preferred practice to mount a plurality of three transformers with the mounting bracket apparatus 10. However, as illustrated in FIG. 1, more or less than three transformers or items of equipment E and E-1 may be mounted by the apparatus 10. Accordingly, the equipment E that may be supported by the present invention should also not be considered limited to any specific number of items of equipment or devices that are supported by the apparatus 10 on the object O.

In actual practice or use of the present invention, the object O, to which the apparatus 10 is operably secured at a desired location may take many configurations or forms. The object O that may be used to support the apparatus 10 is not limited to any specific type of object and the present invention should not be considered so limited.

The object O is normally and preferably disposed or positioned in a substantially vertical orientation or upstanding position in some desired and known, conventional manner. The vertically extending object O extends in a longitudinal or length dimension and forms a longitudinal axis X that passes through the geometric center of the object O. That longitudinal axis X is also substantially vertically disposed or positioned when the object O is operably oriented upright. The substantially vertical orientation or upright position of the object O and longitudinal axis X may angularly deviate from the true or precise vertical without departing from the scope of the present invention.

For the purpose of describing the present invention, the terms vertical and horizontal are used to describe various orientations and relationships. It being understood that such terms, as used herein for describing the present invention, are not employed in a precise, exacting or limiting sense, but rather in an approximate or substantial relative sense. The scope of the present invention should be construed in this same broad context or sense.

Normally the apparatus 10 is installed on the object O at a desired elevated distance above the ground or earth location (not illustrated). The elevated location is usually desired for convenience and safety reasons, but is not essential to or required in the practice of the present invention. The remote elevated location is normally in close proximity with the electrical power lines usually also carried by the object O and is isolated from most human tampering contact. However, such elevated location is usually situated to make in place assembly of the apparatus 10 on the object O by the workers ordinarily more difficult and somewhat hazardous due to the proximity to the high voltage wiring carrying the electrical current.

The only essential parameter or required operable securing characteristic of the object O, at the desired supporting or mounting location for the apparatus 10, is that it includes a substantially cylindrical outer surface S inherently formed by a substantially circular outer cross-section C, as those terms are further explained herein. For purposes of this description, a true and exact concentric relationship of the cylindrical surface S and cross-section C about center axis X will be employed. In actual practice, the longitudinal axis X of the upright object O is disposed generally, substantially or approximately concentric relationship with the circular outer cross-section C and cylindrical outer surface S. The object O thus forms the generally outer circular cross-section C having a forming diameter or radius associated with its longitudinal axis X that maintains within acceptable circumference limits the generally cylindrical outer surface or shape of the object O. The substantially cylindrical outer surface S inherently formed by the substantially circular outer cross-section C follows regardless of whether the object O is of solid or hollow construction.

Preferably, the object O is provided by a normal or conventional lighting or utility pole that may be formed of metal or of wood with the latter generally being more common due to the relative cost involved and the electrical insulating characteristics. For purposes of this disclosure, the support member or object O will be specifically described as a utility pole, but the present invention should not be considered as limited to utility poles. The forming diameter of the circular cross section C may vary from pole to pole O. The standard solid wooden utility poles O typically or normally vary in a diameter range from 6 inches to 12¼ inches in diameter. This produces a 5¼ inch cross-section diameter difference, variation or range forming the circumference of the outer surface S in which the apparatus 10 is preferably designed to operate. The apparatus 10 is preferably employed with poles or other objects O having an outer cross-section diameter falling within that approximate diameter range, but the present invention should not be considered to be limited to any specific size or diameter range. Greater or smaller pole O outer diameters may be easily accommodated by the present invention by simply employing longer or shorter interconnecting members or straps as will become apparent.

As wooden poles do not grow with a precise outer cylindrical surface shape S or an outer surface circular cross-section C, those terms are employed loosely and in a very broad general sense with respect to the substantially cylindrical outer shape S forming the substantially circular cross-section C at the desired mounting location on the object O. Out of roundness or egg-shaped cross-sections of the pole O are easily accommodated by the adjustment range of the apparatus 10. A metal pole O having an almost or substantially regular polygon cross-section outer configuration formed with a sufficient number of sides to produce in operable effect, a substantially circular outer cross-section C or substantially cylindrical surface S at the desired location, falls within the acceptable range or parameters of securing characteristics of a pole O for mounting the apparatus 10. The substantially circular outer cross-section C inherently forms in operable effect a substantially cylindrical outer surface S, in the context of the present invention, to which the apparatus 10 may be operably secured or affixed.

The substantially cylindrical outer surface shape of the object O may in actual practice be conically tapered or otherwise formed with irregularities either by the natural growing process of wooden poles or design and construction of metal utility support poles. Such conical taper or slope or other irregularities of the outer surface of the object O are well within the normal circumferential adjustment range in which the apparatus A may be operably installed. The substantially cylindrical outer surface S and substantially circular outer cross-section C should be construed to accommodate the taper and other surface irregularities of the pole O at the desired installation location.

In summary, the apparatus 10 is designed to accommodate at the mounting location the normal and reasonable deviations or variations of the general characteristics of the pole O used in actual practice of the present invention. Both the cylindrical outer surface S and circular outer cross-section of the pole P may reasonably deviate from the exact and precise geometric relationships described without departing from the scope of the present invention.

As best illustrated in FIG. 1, the mounting bracket apparatus 10 includes a plurality of object contact members, generally designated 12, one or more equipment mounting brackets, generally designated 14, a plurality of tension carrying members or interconnecting straps, generally designated 16, and tension assembly means, generally designated 18, for circumferentially innerconnecting the object contacting members 12. The mounting brackets 14 are releasably connected or mounted to the object contacting members 12 for carrying the transformer E. The tension carrying straps 16 and the tension adjustment assembly means 18 operably interconnect the plurality of support members 12 for holding each support members 12 in the predetermined circumferentially spaced surrounding pattern and in supporting contact with the pole O. Hoop tension induced in the connecting tension carrying straps 16 and the support members 12 by the adjustable tension assembly means 18 radially constricts the apparatus 10 for forcing the plurality of support members 12 in holding engagement with the pole O.

Each tension assembly means 18 includes a pair of tensioning and adjustment straps or members 20 and 21 operably connected by a conventional adjustable threaded bolt and nut assembly 22 to induce hoop tension in the apparatus 10 and radially constrict each of the plurality of object contacting members 12 in supporting engagement with the object O. Rotational make up of the helically threaded assembly 22 in the conventional known manner will draw the tensioning adjustment members 20 and 21 together for inducing the hoop tension in the apparatus 10. By proper rotational make up of the bolt and nut assembly 22, the hoop tension preload induced in the tension straps 16 and adjustment straps 20 and 21 of the apparatus 10 serves to force the plurality of object contacting members 12 in radial inward or in constricting relationship about the outer surface S of the object O. The circumferentially spaced disposed relationship contact of the object contacting members 12 about the pole O forces or radially constricts each member 12 into friction and bearing holding contact with the outer surface S of the object O in response to the hoop tension to clampingly secure or fix the apparatus 10 at the desired location on the object O.

As illustrated in FIGS. 2 and 3, each of the plurality of object contacting or friction support members 12 has a first end surface 30 and a second end surface 32 with the first end surface 30 preferably disposed or positioned above the second end surface 32 when operably vertically mounted on the pole O. Due to the generally symmetrical construction of the support members 12 in the manner to be described, the installed or operable position of the end surfaces 30 and 32 may be reversed in position during assembly of the apparatus 10 without departing from the scope of the present invention. The end surfaces 30 and 32 are spaced apart a sufficient distance to give each support member the generally elongated configuration and its longitudinal or length dimension. The formed length dimension or distance between the end surfaces 30 and 32 may be varied as desired, but preferably a common or uniform length dimension is used for all of the support members 12 used in forming a particular apparatus 10 for interchangeability purposes during assembly. The selected length of the support members 12 may be varied from installation to installation depending on the load of the supported equipment E. In FIG. 2 a short length or compact apparatus 10 is provided by the support members 12 for supporting moderate weight transformers E while the illustrated longer support member 12 embodiment of FIG. 3 is preferred for heavier transformers.

If desired, each support member 12 may be provided with an opening 33 (FIG. 1) aligned with the vertical plane Z—Z and adjacent one or both end surfaces 30 and 32 through which a nail or lag bolt may be temporarily installed for holding the support member 12 to the pole O when installing or connecting the tension straps 16 and tension assembly or adjustment means 18 to form the apparatus 10. This greatly simplifies and enhances the ease at which the apparatus 10 may be assembled at an elevated support location.

The plurality of support members 12 are operably disposed in the predetermined circumferentially spaced clamping pattern surrounding the object O. Each generally elongated base or support member 12 forms a geometric centerline longitudinal axis Y. Each elongated base member 12 is preferably disposed or oriented vertically when positioned in the predetermined clamping pattern so the longitudinal axis Y of each support member 12 is substantially parallel with the longitudinal axis of the pole O. The geometric center or longitudinal axis X of the pole O and the longitudinal axis Y of the base member 12 forms a centerline plane Z—Z that is also disposed substantially vertical. The centerline plane Z—Z of each support member 12 extend radially outwardly from the longitudinal axis X of the pole O for effectively longitudinally bisecting that support member 12.

The support members 12 are preferably substantially circumferentially spaced about the substantially outer cylindrical surfaces of the pole O to enhance the clamping force of the apparatus 10. When the preferred and illustrated plurality of three support members 12 are employed in the circumferentially spaced relationship the angle formed between the intersecting vertical centerline planes Z—Z at the pole axis X is approximately 90°. If a plurality of more than three support members 12 is employed the angular intersecting relationship of the planes Z—Z is adjusted accordingly. While a plurality of three support members 12 has been disclosed those skilled in the art may employ a greater plurality without departing from the scope of the present invention.

As the support members 12 are preferably formed substantially identical for purposes of interchangeable assembly of the apparatus 10, only the construction of one support member 12 need be described in detail. As explained above the elongated length of the support members 12 may be sized or varied as desired. Each of the elongated object contacting or support member 12 is preferably formed with a substantially U-shaped cross-section (FIG. 5) that extends substantially its entire longitudinal length between end surfaces 30 and 32. Preferably, the U-shaped cross-section support member 12 is formed from known, commercially available metal plates or preformed structural channels that are then shaped by conventional known metal rolling processes and then cut to the desired longitudinal or elongated length to the desired configuration illustrated and described for use. As a result of the starting shape and method of forming the cross-section thickness of the support member 12 is preferably substantially uniform. However, those skilled in the art may vary the cross-section thickness of the support member 12 without departing from the present invention.

Figure 5:
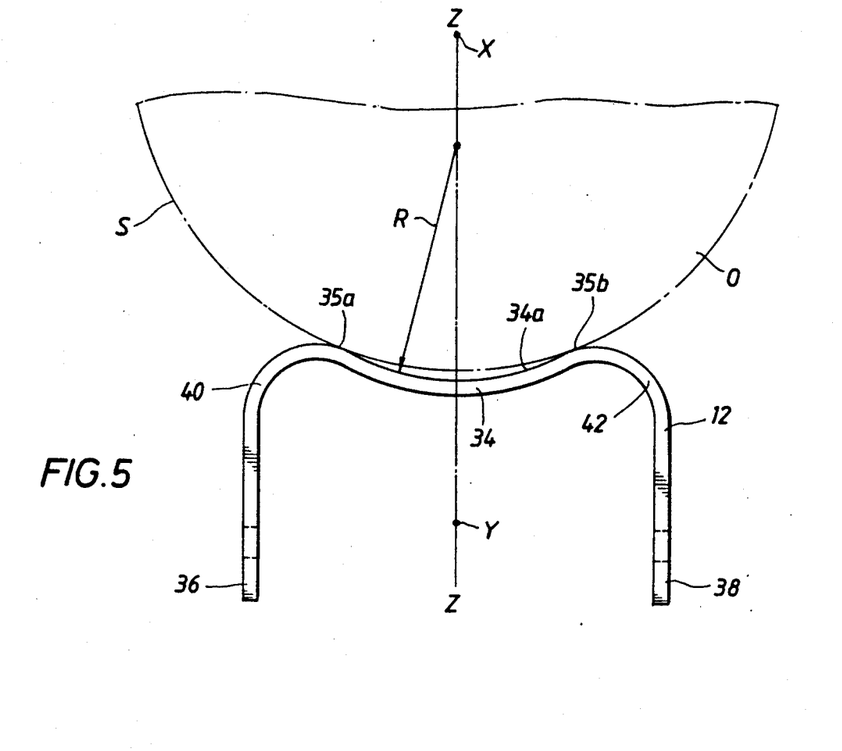
FIG. 5 is a top view showing the cross-section of the object contacting member.

As illustrated in FIG. 5, each support member 12 includes a central web or base portion 34, a pair of spaced apart parallel flanged portions 36 and 38 and a pair of transition portions 40 and 42, respectively, for connecting the flange portions the base portion 34. The width dimension of support member 12 formed between the parallel flanges 36 and 38 is approximately 5½ inches. Each of the flanges 36 and 38 preferably extend the full length of the support member 12 between end surfaces 30 and 32 to increase or enhance the structural rigidity of the support member 12. When operably positioned on the pole O, the flange portions 36 and 38 and extend outwardly of the base portion 34 when the object contact surface 34a engages the pole O. The substantially flange portions 36 and 38 and curved transition portions 40 and 42 are preferably disposed symmetrically about the centerline plane Z—Z when the object contact surface 34a is operably mounted on the pole O.

The base portion 34 forms an arcuate concave surface contacting portion 34a for operably engaging and contacting the substantially cylindrical outer surfaces of the pole O when the support member 12 is operably positioned thereon. The preferred forming radius R of contact surface 34a is approximately 3 inches so the resulting arcuate contact surface is intentionally different from the forming radius of cross section of the pole O as illustrated in FIG. 5. The contact surface 34a includes a generally arcuate concave shape of such forming diameter or radius that the actual friction or bearing contact engagement of each support member 12 occurs at two separate engagement areas 35a and 35b (FIG. 5) of the surface 34a with the pole O. In actual practice of the present invention the distance from the centerline plane Z—Z to the engagement areas 35a and 35b will vary slightly due to the geometric relationship of the forming diameters of the pole O and contact surface 34a. The actual pole engagement areas 35a and 35b are disposed on the surface 34a symmetrically and on opposite sides of the centerline plane Z—Z to enhance the holding engagement of the apparatus 10 with the pole O. Each of the two pole engagement areas 35a and 35b extends generally parallel to the plane Z—Z from the first end 30 to the second end 32 of the support member 12. By holding or placing the actual contact engagement on opposite sides of the vertically extending plane Z—Z, the contact or engagement force of the support member 12 with the pole O is substantially equally distributed to each of the contact areas 34a and 35a. The normal or tangential contact force at each contact area 35a and 35b forms optimized force component vectors that are better oriented or positioned to resist torsion or twisting of the support member 12 on the outer cylindrical surface S than a single vector along the centerline plane Z—Z.

The forming radius or diameter of the concave contact surface 34a also spaces the center portion of surface 34a adjacent the plane Z—Z from contact with the pole O. This central spacing arrangement enables the curved base portion 34 of the support member 12 to flex or elastically strain slightly between the engagement areas 35a and 35b to share or help carry the hoop tension loading. The hoop tension of the apparatus 10 tends to lengthen or straighten the curved base portion 34 and which straightening deformation is resiliently resisted or opposed by the spring like action of the base portion 34.

Each of the transition portions 40 and 42 are preferably formed with a curved shape provided by an internal forming diameter or radius to minimize internal stress concentrations such as those arising from the interconnections with the tension straps 16 or tension adjustment straps 20. The transition portions 40 and 42 have or form a generally convex or bowed shape adjacent the pole O so that the hoop tension force tends to flatten or straighten the curved transition portions 40 and 42. The transition portions 40 and 42 curved construction provides a flexing or spring like resistance as well as elastic strain resistance to the straightening of the transition portions 40 and 42. The straightening of the curved or rounded transition portions 40 and 42 in response to the induced hoop tension loading also tends to distribute, share or equalize stress and strain between the support members 12, connecting links 16 and adjustment straps 20 and 21. The straightening tendency of the transition portions 40 and 42 also tends to minimize pull out of the connected tension carrying members 16, 20 and 21.

The base member 12 includes a plurality of T-shaped slots or interconnecting attachment openings 44 that are preferably formed in the curved transition portions 40 and 42 for operably receiving the ends of the tension straps 16 or the tension adjustment straps 20 and 21 for operably interconnecting the base members 12 in the pole surrounding relationship about the pole O. The bearing engagement surface area of support members 12 adjacent the T-slots 44 serve to distribute and transmit the hoop tension between the tension straps 16 and the tension adjustment members 20 and 21 connected to the support member 12. A plurality of two T-slots 44 are preferably disposed in each of the transition portions 40 and 42 and are located adjacent the upper and lower end surfaces 30 and 32. The vertically spaced location of the two longitudinally spaced apart T-slots 44 on each transition portion 40 and 42 also define the substantially horizontal hoop tension interconnecting levels of the support members 12. In the illustrated embodiment of FIG. 2 a single level of pole encircling hoop interconnecting arrangement of tension straps 16 and tension assembly means 18 are employed while the embodiment of FIG. 3 shows two horizontal levels of encircling interconnecting hoop arrangements. Those skilled in the art may provide additional hoop or encircling levels by forming additional T-slots 44 on each of the support members 12 without departing from the scope of the present invention.

Figure 6:
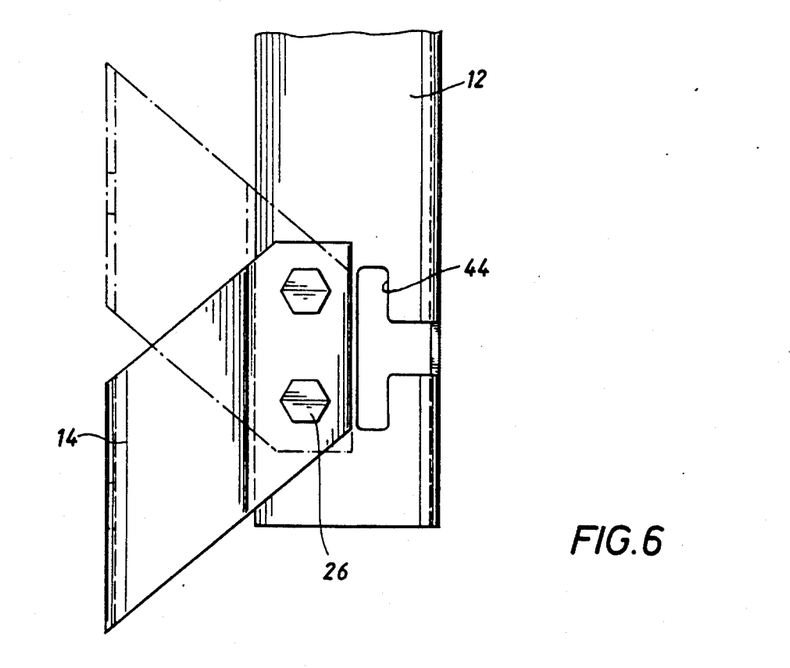
FIG. 6 is a partial side view of an object contact member illustrating the openings for operably receiving the connecting means strap.

Preferably each of the plurality T-slots 44 are formed identically for interchangeable assembly, so only one need be described in detail. As best illustrated in FIG. 6, each T-slot 44 is positioned or disposed sideways on the transition portions 40 and 42 of the support member 12 and provided with an enlarged vertically disposed out slot portion and a narrower portion adjacent the base portion 34a. The tension straps 16 and tension adjustment members 20 and 21 are freely slidably movable through the enlarged portion of the T-slot 44 for connecting and adjusting the position of the support members 12 during assembly. When a tension strap 16 or tension adjustment link 20 and 21 is appropriately positioned and aligned in the appropriate T-slot 44 it is simply moved circumferentially radially inwardly towards the center of the pole O and into the narrow portion of the slot 44 for operably engaging the transition portion adjacent the narrow portion of the T-head slot 44 for effecting the desired hoop connection with the support member 12. In this manner, the hoop tension in the tension straps 16 or adjustment members 20 and 21 is transferred to the base member 12 and holds the interconnecting members 16, 20 and 21 in the narrow portion of the T-slot 44.

The radius or forming diameter of each transition portion 40 and 42 is of sufficient size to enable limited bending or flexing to minimize stress concentrations induced in the support member 12 by the hoop tension carried by the connecting straps 16 or adjustment straps 20 and 21. The forming diameter or radius of the arcuate contact surface 34a of the support member 12 between the contact areas 35a and 35b is also sufficiently large that when operably installed and suitably tensioned the circular base portion 34 of the object contact member 12 is elastically strained or preloaded sufficiently to provide a resilient tension hood force in the event of unexpected undesired environmental or impact loadings. Such flexing or elastic strain of the curved base portion 34 also compensates for any permanent defamation or elongation of the tension straps 16 resulting from localized over-stress. The adjustable tensioning means 18 induces a sufficient preload hoop tension for elastically straining the base portion 34 and transition portions 40 and 42 of the base member 12.

The equipment mounting brackets 14 employed to support the transformer E on the apparatus 10 are illustrated in FIGS. 1-3. The mounting brackets 14 are also preferably formed from conventional uniform thickness metal plate material by any suitable known shaping process. Preferably, the brackets 14 are formed substantially identical for interchangeable assembly in the apparatus 10 and it is only necessary to describe only one in detail. Each of the plurality of mounting brackets 14 are substantially U-shaped in cross-section having a flat, web or base portion 14a, a pair of transition or support arm sections or portions 14b and 14c, and a pair of parallel connecting flanges or side extensions 14d and 14e. Each base portion 14a includes one or more circular openings 14f formed thereon to provide means extending outwardly from the support member 12 for receiving the attachment or securing bolt or threaded studs 24 from the transformer or other suitable means for mounting the equipment E to the apparatus 10.

Each of the flanges 14d and 14e includes suitable means to releasably connect or secure the bracket member 14 to the object contact member 12. Preferably one or more drilled openings are provided through which known, conventional helically threaded bolt and nut assemblies 26 may be installed. It will be immediately appreciated by those skilled in the art that the disclosed threaded securing connection 26 of the bracket 14 provides additional structural strength or reinforcing support to the flange portions 36 and 38 and transition portions 40 and 42 of the base member 12 to resist their straightening by the hoop tension loading. Thus, the bracket 14 helps to carry or share the hoop tension loading and resist unexpected additional tension loadings.

The transition portions 14b and 14c of the bracket member 14 are preferably angled vertically from the attachment flanges 14d and 14e. This angled construction of the brackets 14 enables their installed or operating location or position to be reversed or inverted on each of the base members 12 for adjusting the location of the equipment attaching opening 14f. Such reversal of an installed arrangement is illustrated in phantom in FIG. 2. It being understood that such reversible installed location arrangement can be utilized to adjust the locations of the openings 14f as desired to conform with the various types and shapes of the supported equipment E.

Each of the plurality of metal tension-carrying member or strap 16 employed to interconnect the support members 12 is preferably formed from a standard uniform thickness metal plate that is commercially available from a number of sources. The tension straps may be flame-cut, and surfaces then grounded to the desired outer configuration or shape. However, it is preferred that the tension straps be stamped or sheared to the desired configuration using conventional known manufacturing process. The thickness of tension strap 16 and the size of the enlarged portion of the T-slots are predetermined to enable the sliding insertion for effecting the operable connection with the T-slot 44.

As the plurality of interconnecting tension straps 16 are formed substantially identical within manufacturing tolerances to be fully interchangeable in use, it is only necessary to describe only one in detail. Each tension strap 16 includes a first longitudinal end 16a and a second end 16b for defining the parallel opposite ends and the length dimension of the strap 16. Each tension strap 16 includes an elongated top edge or open end 16c and a bottom edge 16b that are preferably disposed parallel to each other and spaced apart to enable sliding passage through the enlarged head of the T-slots 44. Viewed from the side, the tension strap 16 has a generally rectangular configuration. Each tension strap 16 is preferably symmetrically shaped about the longitudinal midpoint or center between the first end 16a and the second end 16b.

The top or upper and bottom lower edge 16c and 16d is provided with a predetermined paired arrangement of a plurality of longitudinally spaced cut outs, slots, recesses or connecting notches 16e located adjacent each of the longitudinal ends 16a and 16b. The plurality of notches 16e are preferably arranged symmetrically adjacent the ends 16a and 16b and are arranged or coordinated in aligned pairs at the locations to enable adjustable length connection with the T-slots 44. Each of the notches 16e are dimensioned so the portion of the tension member 16 between the vertically aligned paired notches 16e will be received in the narrow portion of the T-slot 44, but of sufficient remaining cross-sectional area to safely and elastically carry the preload stress and strain of the hoop tension load. The notches 16e are shaped to provide a relatively large connecting engagement area with the transition portion 40 and 42 to transmit the hoop tension loading and minimize pull out of the tension strap 16 from the T-slot 44. The longitudinal spacing of the connecting notches 16e enable the hoop connecting arrangement of the tension straps 16 to be made rapidly and easily with the support members 12 while accommodating a substantial variation in pole O diameter or circumference.

If desired the tension member 16 may be curved or bowed in construction (FIG. 1) rather than flat or straight, but in either event the tension straps 16 should be radially spaced from the pole O. This enables the tension straps 16 to freely elongate or contract in use. If the curved or bowed construction is employed, the preload hoop tension will tend to straighten or flatten the longitudinal portion of the tension member 16 between the T-slots 44 of the connected support members 12. The resistance of the curved construction of the tension straps 16 to this straightening force provides a spring like action that resists pull out and plastic strain.

The plurality of notches 16e selectively engage the T-slots 44 of the member 12 for operably interconnecting the base members 12 at a desired level and arranging them in the desired circumferentially spaced relationship about the object O. Each of the tension straps 16 is inserted through the T-slot 44 formed in one side of the support member 12 and the T-slot 44 of the circumferentially spaced adjacent support member 12 and slidably adjusted to align the paired notches 16e. Preferably each tension strap 16 is centered between the connected support members 12. When the tension strap 16 is then moved inwardly (radially relative to the pole O) into the operable or connected position of the T-slots 44 the notches 16e engage the transition portions 40 and 42 for securing the support member 12 in operable engagement with the pole.

The tension assembly means 18 is interconnected between two of the circumferentially spaced support members 12 at each desired connecting level. The threaded nut and bolt assembly 22 is used to adjust the length of the tension assembly means between the spaced support members 12 and induce the hoop tension in the pole encircling apparatus 10. The preferred nut and bolt assembly is formed by a conventional bolt or stud helically threaded substantially over its entire longitudinal length to provide a substantial operating range of adjustment. The nut and bolt assembly 22 are simple, common, releasable and adjustable fasteners commonly available commercially from numerous sources. Nut and bolt assemblies including many forms of washers are well known to those skilled in the art as well as to workers involved in assembly of mechanical devices. For these reasons, the nut and bolt assembly 22 need not be described in greater detail.

Figure 4:
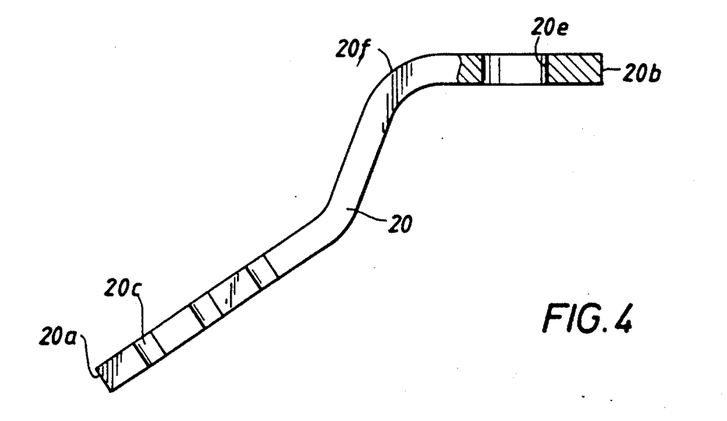
FIG. 4 is a top view of an adjustable tension connecting strap showing the angular configuration.

As the preferred tension adjustment straps 20 and 21 are also identical in construction so they may be used interchangeably in assembly of the apparatus 10, it is only necessary to described only one in detail. As illustrated in FIG. 4 each adjustment strap 20 includes a first end 20a and a second end 20b and a curved mid section 20c disposed there between. Each of the adjustment straps 20 and 21 is preferably formed of a metal plate material having a uniform thickness that is commercially available and suitably formed to the desired shape or configuration illustrated.

The first end 20a and 21a of each adjustment strap 20 and 21 are provided with suitable means for adjustably connecting with one of the support members 12. Preferably the first ends 20a and 21a are also provided with a plurality of longitudinally spaced, aligned and paired notches 20c and 20d for connecting in the T-slots 44 of the support members 12 in the same manner as the tension straps 16. As that construction, arrangement, use and operation has been described above it need not be repeated here. By using the same arrangement for connecting to the support means 12, the tension adjustment means 18 may be installed at the most convenient or accessible location on the pole O for adjustably tightening the nut and bolt assembly 22. By connecting to the T-slot 44 having the narrow center securing portion the operating location of the adjustment straps 20 and 21 may be interchanged in operating or installed location by simply inverting or reversing the direction of installation on the support members 12. Preferably the first end 20a is provided with the aligned paired of a plurality of notches construction described above for the tension straps 16.

The second end 20b of each adjustment strap 20 having a bolt receiving opening 20e disposed adjacent thereto and a curved positioning surface 20f being shaped so that when the adjustment strap 20 is installed on the pole O the bolt receiving opening 20e is aligned with the bolt receiving opening 21e of the other of the adjustment strap 21. The flexing curved portions 20f and 21f engage the pole O for assisting in the desired circumferential spaced clamping or securing of the apparatus 10. The aligned openings 20e and 21e in the adjustment straps receive conventional helically threaded stud or bolt assembly 22 therein for drawing the second ends 20b and 21b toward each other to conform to the pole O and effect hoop tensioning. This tensioning effect is transmitted through the spaced base members 12 and the tension carrying straps 16 to radially clamp or frictionally engage each support member 12 with the outer surface S of the pole O.

It will be immediately appreciated by those skilled in the art that the interchangeable components employed in the present invention, greatly simplifies assembly of the apparatus 10. The economy of manufacture achieved by using interchangeable parts also greatly reduces the cost of the apparatus 10.

USE AND OPERATION

In the use and operation of the present invention, the apparatus 10 is assembled or installed on the pole P in the surrounding manner described and illustrated. The extremely simple manner of interconnecting assembly and installation of the few components of the apparatus 10 has been described and which manner will be readily apparent to the workers. The support members 12 are generally positioned about the poles O and the connecting tension links or straps 16 and the tension adjustment members 20 and 21 are operably connected using T-slots 44. The interconnecting arrangement of components 16, 20 and 21 may be done at one or more levels as desired. The workers installing the apparatus 10 may vary or tailor the manner or sequence of assembly of the components as individually desired to accommodate each installation. For convenience and to expedite matters, all or some of the components may be operably connected at ground level by the workers before placement at the desired location on the pole O. For example the brackets 14 may be bolted to the support members 12 at ground level.

The final step of assembly is to properly make up the bolt and nut assembly 22 to induce sufficient operating preload hoop tension to clamp or frictionally hold the apparatus 10 to the pole O. This frictional holding or clamping force of the apparatus 10 is a function of the force at which the support members 12 are urged against the outer surface S of the object O. The theoretical frictional holding force of each support member 12 may be determined or calculated by multiplying the contact bearing force or normal vector force component times the coefficient of friction between the contacting surfaces. As coefficient of friction is primarily determined by the materials of construction and their surface finish, the normal or perpendicular vector force is used to maintain the clamping friction contact. In practice, a small usual misalignment creates a binding effect for enhancing the holding force of the apparatus 10.

The vector forming the frictional contact bearing force is a function of the hoop tension induced in the tension straps 16 and tension adjustment members 20 and 21 by the bolt and nut assembly 22. The greater the induced hoop tension forcing the support members 12 in contact with the outer surface S of the pole O the greater the inward force vector producing the resulting frictional clamping force. By inducing a sufficient preload hoop tension in the apparatus 10 with the bolt and nut assembly 18 inadvertent loosening of the clamping force may be prevented.

The tightening of the nut and bolt assembly 18 draws or pulls the tension members 20 and 21 together. As the tension members 20 and 21 are also operably connected to two of the support members 12 those support members 12 are drawn into contact with the outer surface S of the pole. Continued tightening of the nut and bolt assembly 22 will remove the slack in the connection of tension carrying straps 16 and the support members 12 to bring each of the plurality of support members 12 into tight engagement with the outer surface S of the pole O. Further tightening of the bolt and nut assembly 22 induces a hoop tension force in each of the operably connected support members 12, the interconnecting links 16 and the tension adjustment members 20 and 21. This hoop tension load or force creates a tension stress and strain in each of the interconnected components 12, 16, 20 and 21. The hoop tension force also urges each of the support members 12 into compressive bearing contact with the outer surface S of the pole O to produce the frictional clamping force.

If more than one interconnecting level is employed to produce the securing hoop tension, the above procedure is repeated for each level.

When installed on the pole O, the apparatus 10 is inherently subjected to and must internally carry or resist the constant normal static forces of tension, compression and shear loadings, as well as bending moments created by the mounted equipment E. Such static forces create levels of stress and strain in the various components of the apparatus 10.

In use, additional undesired static and dynamic loadings or forces are often induced in the apparatus 10 by unforeseen events or naturally occurring environment events. If the pole O is struck by an automobile, an additional dynamic shock or impact loading to the apparatus 10 occurs. Earthquakes and, more commonly, high winds also greatly increase the level of force loadings of the transformers E and may create a torsion or relative twisting of the apparatus 10 about the pole O. Those additional dynamic loadings must also be safely and securely carried by the apparatus 10 to achieve its intended useful purpose.

Such undesired dynamic force loadings are partially compensated for during design of the apparatus 10 by reducing the anticipated level of constant static design stress or strain of each of the tension load carrying components. This provides a substantial additional reserve increment of elastic strain availability in each component for increased hoop tension. As long as the hoop tension does not exceed the acceptable elastic limits of stress and strain for the materials of construction used there is no operable change in the apparatus 10.

Often such undesired dynamic force loading will create localized stress or strain in some of the components of the apparatus to effect permanent plastic, rather than desired elastic, strain deformation. This usually occurs in the tension straps 16 and adjustment members 20 and 21 or their connection with the support members 12. To prevent pull out of the interconnecting components from the support members 12 relative large bearing areas are provided adjacent the T-slot connections 34 to adequately spread the interconnecting bearing load. By curving the tension straps 16 and flexing of the transition portions 40 and 42 the possibility of pull out failure is minimized in the apparatus 10.

In the past the tension straps 16 and adjustment straps 20 and 21 employed to radially construct the support plates 12 against the pole O have been particularly vulnerable to plastic elongating deformation from localized high stress tension loadings. In the event of a localized force that plastically deforms or strains a tension strap 16 or the adjustment straps 20 and 21 the tension created clamping force of apparatus would be loosened about the pole 10. As the frictional holding force resisting the twisting or torsion of the apparatus 10 about the pole O it is critical to reliable use of the apparatus 10.

The apparatus 10 of the present invention automatically compensates for reduction in the preload hoop tension by automatically minimizing, sharing, cushioning or distributing the effect of the undesired loadings.

The preload stress and strain design of the base member 12 also shares or transfers the dynamic loading in the tension straps 16 and adjustment members 20 and 21 to resist any plastic strain. By elastically straining or flexing the arcuate base portion 34a and the transition portion 40 and 42 of the support member 12 in response to the preload hoop tension a localized plastic elongation of an interconnecting strap is automatically compensated for in the design of the present apparatus 10.

The concave flexing arrangement of contact surface 34a of the support member 12 serves to prevent loss of frictional clamping force of the apparatus 10 resulting from dynamic force loading by distributing, sharing or equalizing the carried hoop tension force loadings.

The arcuate engagement surfaces 35a and 35b enable the base portion 34 to flex or bend to cushion or elastically strain while maintaining contact with the pole O for minimizing the pull out shear loading of the tension straps in the T-slots 44 and sharing of localized dynamic tension stress and strain with the tension straps 16. By cushioning and enabling the sharing of this loading among the interconnected support members 12, the possibility of permanent plastic elongated deformation of the tension straps 16 and tension adjustment members 20 and 21 is minimized.

By concentrating the parallel contact areas 35a and 35b on either side of the centerline plane Z—Z, one of the two normal clamping vectors of each support member 12 is optimally positioned to resist torsional loading of the apparatus 10 on the pole O in either direction.

While the apparatus 10 of the present invention may be formed by any suitable grade or type of metal material both steel and aluminum can be employed as materials of construction for the apparatus 10. Steel is preferred over aluminum because the acceptable stress levels do not elastically strain the material to the same unit deformation. A steel meeting the specification of the American Society of Testing Materials (ASTM) grade A36 is considered preferable as the material of construction. In non-technical language, the non-deforming or elastic stretch of steel is not as great as that of aluminum for the same unit stress. It will be appreciated by those skilled in the art that any appreciable plastic strain deformation of any one of the interconnecting members 16, 20 or 21 will tend to loosen the clamping force of the support members 12 with the pole. By using steel a greater elastic strain reserve or design safety factor is provided than by aluminum materials. Of course, such steel must be suitably protected from corrosion by a zinc coating, galvanizing or other suitable coating.

Since certain changes or modifications may be made in the disclosed embodiment without departing from the inventive concepts involved, it is the aim of the appended claims to cover all such changes and modifications falling within the true spirit and scope of the present invention.

What is claimed is:

1. An equipment mounting assembly adapted for securing about a substantially vertically disposed object having a substantially circular outer cross-section to structurally support equipment carried by the equipment mounting assembly, including:

a plurality of longitudinally elongated object contacting members disposed in a predetermined circumferentially spaced pattern surrounding the object, each of said contacting members having a base portion and a pair of spaced apart parallel flange portions, each said base portion forming an object contact surface for operable holding engagement with the object to fixedly support said member on the object, said object contact surface formed on said base portion to position said flanges extending outwardly of said base portion when the object contact surface engages the object, each of said elongated object contacting members having a longitudinal center line axis, said longitudinal axis of each of said object contacting members and the center of the cross-section of the object defining a substantially vertical center line plane;

means for holding said object contact surface of each of said object contacting members in supporting contact with the object;

said means for holding having means for operably interconnecting said plurality of object contacting members to hold each of said object contacting members in the predetermined circumferentially spaced pattern surrounding the object;

said means for holding having adjustable tension means for radially constricting said plurality of object contact members in holding engagement with the object; and each of said contact surface of each of said object contacting members formed with a radius of curvature to form parallel spaced engagement areas with the object, said engagement areas being disposed substantially symmetrically on opposite sides of said plane so each object contact member forms two contact angles with pole for optimizing the orientation of the force component vectors to ensure the holding of the object contact members in the predetermined circumferentially spaced pattern.

2. The equipment mounting assembly recited in claim 1, wherein:

each said contact surface of each of said object contacting members having a generally arcuate shape of such forming diameter that the bearing contact engagement is effected at two localized engagement areas on each said contact surface and which engagement areas are disposed on opposite sides of the centerline plane to enhance the operable holding engagement of said contact surface with the object by concentrating the holding bearing engagement at the two engagement areas.

3. The equipment mounting assembly recited in claim 1, wherein:

each said contact surface of each of said object contacting members having a generally arcuate shape of such forming diameter to operably space the portion of said object contact surface adjacent the centerline plane from the object to enhance the operable holding engagement of said contact surface with the object by concentrating the holding bearing engagement outwardly of the centerline plane.

4. The equipment mounting assembly recited in claim 1, wherein:

said means for operably interconnecting including a tension carrying strap for connecting adjacent object contacting members, said tension strap having a first end and a second end and means adjacent at least one of said first and said second ends for adjusting the circumferential spacing of the adjacent object contacting members about the object.

5. The equipment mounting assembly recited in claim 1, wherein:

said means for operably interconnecting includes at least two substantially flat tension straps for connecting between one of the object contacting members and each of the adjacent object contacting members.

6. The equipment mounting assembly recited in claim 1, wherein:

said adjustable tension means includes a first and a second adjustment strap;

each of said adjustment straps having a first end and a second end and a curved positioning surface disposed between said ends, each of said first end of each of said adjustment straps having means for adjustably connecting with one of said object contacting members, each of said adjustment straps having a bolt receiving opening formed adjacent said second end, said positioning surface disposed between said first end and said second end for contacting the object to operably position said bolt receiving opening in an aligned relationship with the bolt receiving opening of the other of said adjustment straps, said adjustable tension means including a bolt means received in said opening for drawing said second ends to conform to the object and tension each of said adjustment straps.

7. The equipment mounting assembly recited in claim 1, wherein:

at least one of said object contacting members having an object contact surface having a generally arcuate shape of such forming diameter to operably space the portion of said object contact surface adjacent the centerline plane when said object contacting member is held in supporting contact with the object; and;

said adjustable tension means elastically straining said base portion of at least one of said one object contacting members between the spaced engagement areas to change the forming diameter shape of said object contacting member when radially constricting said plurality of object contact members while maintaining the spacing of the portion of said object contacting surface along the centerline plane.

8. The equipment mounting assembly recited in claim 1, wherein:

each said object contacting members having a curved transition portion disposed between said base portion and each of said flanged portions;

said transition portion having a forming diameter of sufficient size to enable sufficient flexing elastic deformation of said object contacting member to minimize stress concentration induced in said object contacting member by said adjustable tension means in response to undesired dynamic loadings on the equipment mounting assembly.

* * * * *